Patented Jan. 17, 1939

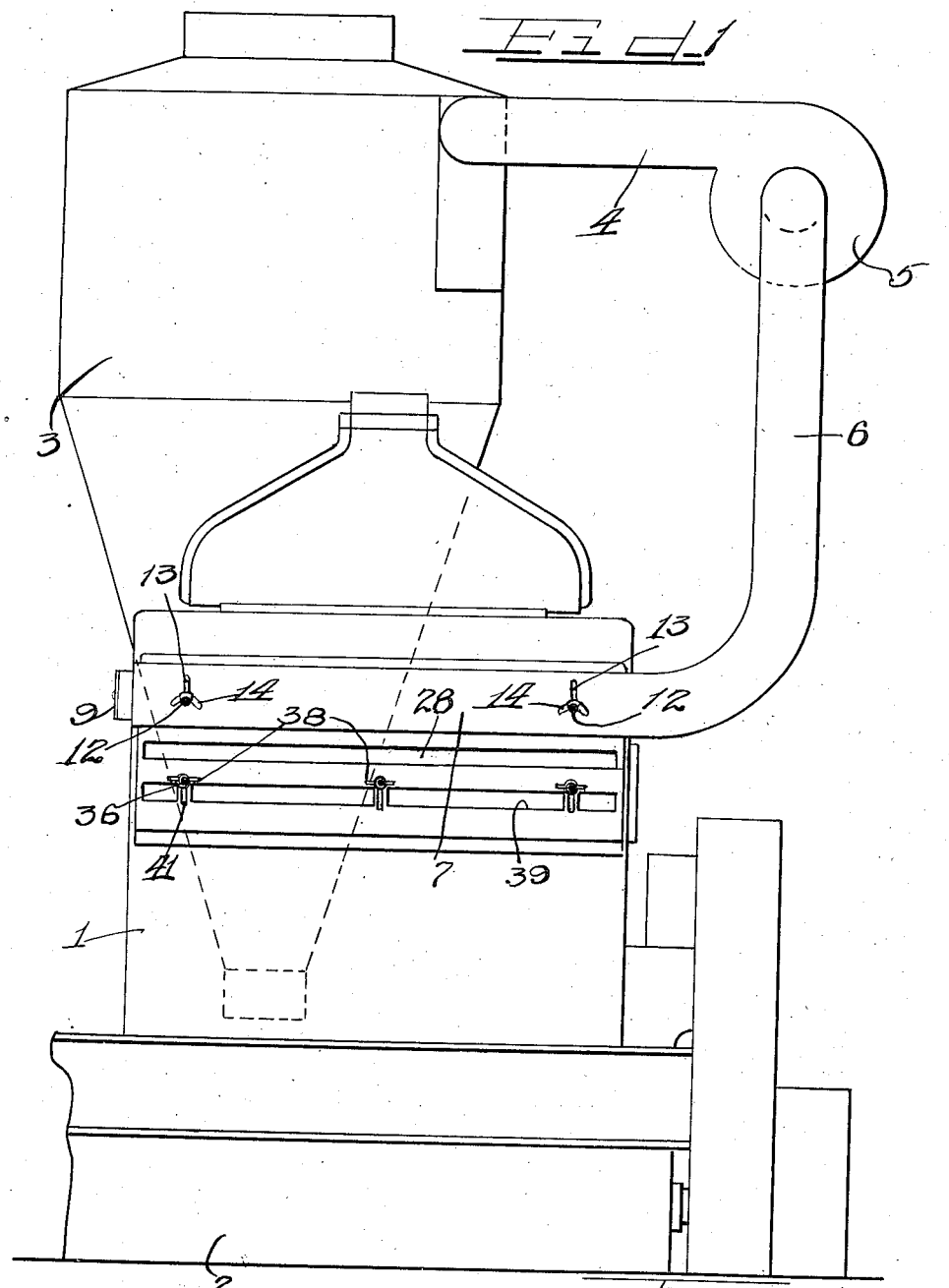

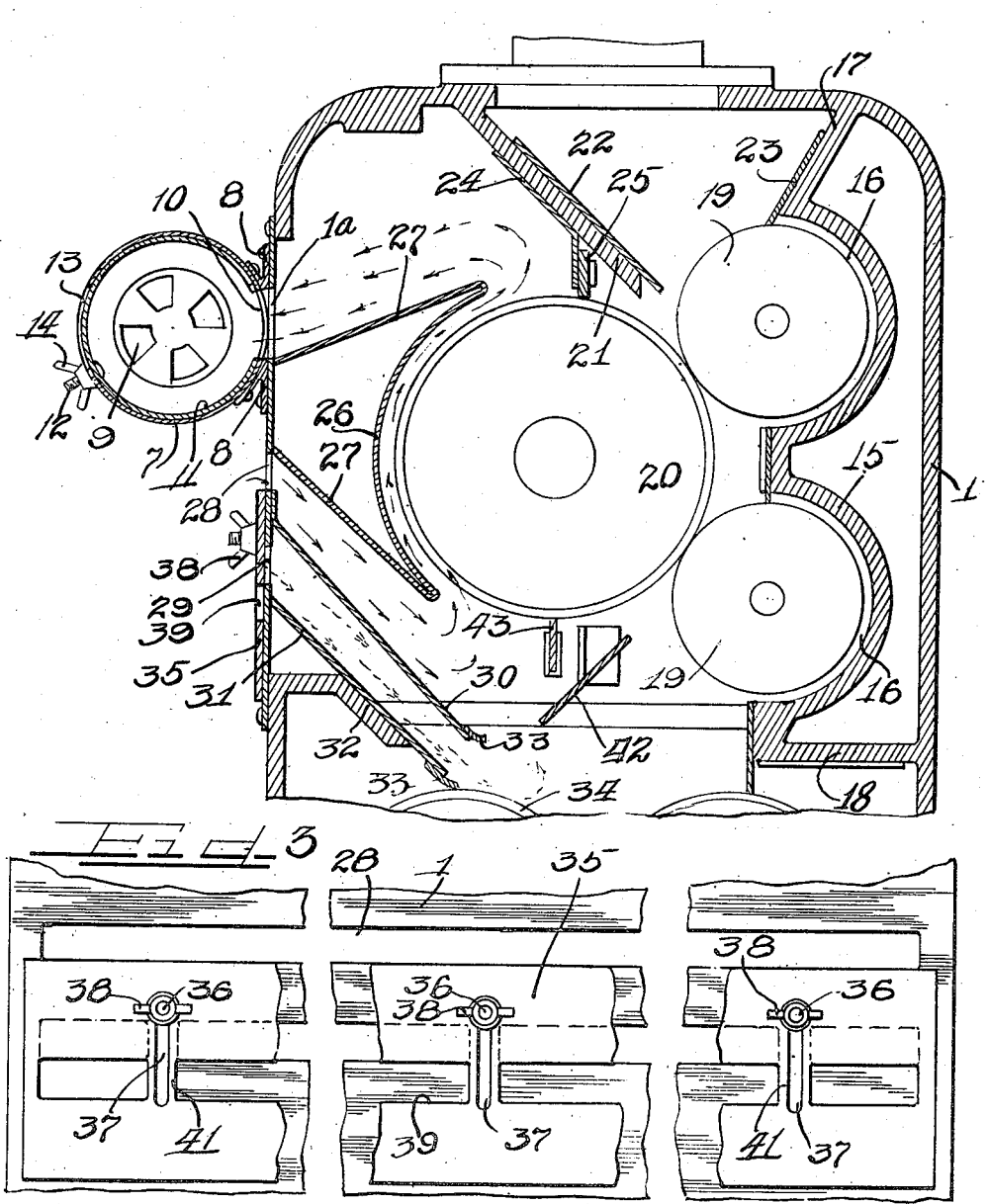

2,144,533

UNITED STATES PATENT OFFICE 2,144,533

CHAFF SEPARATOR FOR COFFEE MILLS

Albert J. Hazle, Jr., Chicago, Ill., assignor to B. F. Gump Co., Chicago, Ill., a corporation of Illinois Application July 6, 1936, Serial No. 88,987

7 Claims. (Cl. 83—18)

This invention relates to a chaff separator for a coffee mill adapted for application to such a coffee mill as is shown in my copending application Serial No. 570,863, filed October 24, 1931.

In the machine disclosed in the above identified application, all of the chaff passes into the chaff comminuting and mixing chamber, and is comminuted and concealed in the finished product. In some instances, coffee roasters desire to remove the chaff or a part thereof especially from certain kinds of coffee.

It is accordingly an object of this invention to provide means in connection with such a coffee mill as is illustrated in my above identified patent for removing chaff from the granulated coffee in the grinding chamber.

The invention comprises the novel structure and combination of parts hereinafter described and more particularly pointed out and defined in the appended claims.

In the accompanying drawings which illustrate a preferred form of this invention and in which similar reference numerals refer to similar features in the different views:

Figure 1 is an elevational view of a coffee mill involving this invention.

Figure 2 is a fragmentary sectional view of the grinding chamber.

Figure 3 is a fragmentary enlarged elevational view of the left-hand side of Fig. 2.

In referring to the drawings, there is shown in Fig. 1, a coffee grinding machine including a casing 1 forming a grinding chamber and a chaff comminuting and mixing chamber 2 therebelow as disclosed in my copending application.

Suitably supported adjacent the machine is a chaff collector 3 from which a pipe 4 extends to a casing 5 that houses a suction fan or the like. From the casing 5, there extends a pipe 6 which has an elbow, that terminates in a horizontal portion 7 extending lengthwise of the grinding chamber and that is attached to the casing 1 by means of brackets 8 adjacent the upper part of the cracking rolls that will later be referred to. The rear end of the horizontal portion 7 of the pipe is provided with a butterfly valve 9 for varying the draft through the suction pipe 7. Adjacent the grinding chamber, the pipe portion 7 is formed with a slot 10 to provide a passage communicating with the grinding chamber through a slot 1a in the casing 1. This passage 10 and slot 1a preferably extend substantially coextensive with the length of the grinding chamber or the rolls therein.

Within the pipe portion 7, there is a cylindrical shutter 11 having a passage corresponding to the passage 10. Screws 12 are anchored to the shutter 11 and extend through slots 13 in the pipe portion 7. Wing nuts 14 which are threaded upon the screws 12 serve to hold the shutter in adjusted position. Thus it is impossible to rotate the shutter 11 to vary the passage 10. To do this, it is only necessary to loosen the nuts 14 when the shutter can be rotated by grasping the screws or nuts as is obvious.

Within the casing 1, there is a wall 15 having concave recesses 16. The wall 15 is connected at its upper end with the casing 1 by means of a sloping portion 17 and it is connected at its lower end with the casing 1 by means of a horizontal portion 18.

Suitable cracking rolls 19 are journalled in the casing and are located in the recesses 16 between the coffee inlet and the chaff outlet 1a. The cracking rolls 19 coact with a large cracking roll 20 journalled centrally in the casing. From the top of the casing 1, there extends a sloping chute member 21 to which a plate 22 is attached that cooperates with a plate 23 upon the member 17 for forming a guide chute for guiding the coffee to the cracking rolls. Upon the lower side of the member 21, there is an angle member 24 to which a guard or scraper 25 is secured that contacts the roll 20 and prevents the coffee beans from spreading and moving over the top of the roll 20, and forms with said roll, an air barrier.

Adjacent the left hand side of the roll 20, there is an arcuate shield 26 that subtends an arc of about 130° with respect to such roll. The shield 26 which extends lengthwise of the roll 20 and substantially coextensive therewith has flanges 27 attached to the left-hand wall of the casing in any suitable manner. The upper flange 27 of the shield 26 guides the chaff to the openings 1a and 10.

The left-hand wall of the casing 1 is provided with air inlet slots 28 and 29. The slot 28 is adjacent the bottom of the lower flange 27. A downwardly inclined plate 30 which is attached to the casing near the lower edge of the slot 28 cooperates with the lower flange 27 for forming an air inlet passage or guideway. Below the slot 29, there is a second downwardly inclined plate 31 that extends from the casing and cooperates with the plate 30 for forming a second air inlet passage or guideway. The plate 31 is shown as supported upon an arm 32 integral with the casing. Desirable leather wipers 33 or the like may be attached to the free ends of the plates 30 and 31. The wiper 33 on plate 31 cooperates with one of the finishing rolls 34 in the lower part of the grinding chamber for guiding the air entering the casing above said finishing rolls.

An adjustable slide gate 35 is attached upon the casing 1 so as to control the air inlet slots 28 and 29. This gate is attached to the casing by means of bolts 36 which extend through vertical slots 37 in the gate. Wing nuts 38 on the bolts may be used to clamp the gate in adjusted position. The gate 35 is provided with a slot 39 adapted to register with the slot 29 for providing an air inlet passage.

It will be noted that in the position shown, the gate closes the passage 29 while the passage 28 is completely open. The slide gate 35 may be adjusted to partially close the slot 28 and partially open the slot 29, or may be adjusted to completely close the slot 28 and open the slot 29. Thus it is possible to let air in simultaneously at two points or alternately at spaced points as desired.

With reference to Figs. 1 and 3, it will be noted that the gate 35 extends substantially coextensive with the grinding chamber 1 or the cracking rolls therein and controls the slots 28 and 29 throughout their length which is co-extensive with the cracking rolls. The air inlet slot 39 in the gate is substantially continuous except for the narrow bridging pieces 41 that contain the vertical adjusting slots 37.

Adjacent the bottom of the roll 20, there is preferably an inclined deflector 42 which may be suitably attached in position for deflecting the cracked coffee and a scraper 43 may be placed above the deflector for cooperating with the roll 20 for preventing the cracked coffee from entering the air stream.

It will of course be understood that during the operation of the machine, the coffee beans are cracked by the rolls 19 and 20 and the chaff is liberated in substantially large flakes. If the suction fan is in operation, this chaff will be aspirated through currents of air through the passage 10 into the suction pipe and be carried to the chaff collector 3. With the adjustment of the parts as noted, it will be possible to vary the amount of chaff removed. The cracked coffee will fall upon the finishing rolls 34 for further reduction and the chaff that is desired to be left in the coffee will also pass through the finishing rolls and then into the comminuting and mixing chamber.

Thus it will be apparent that a novel coffee mill has been provided in which the liberated chaff may be aspirated from the cracking rolls and more or less chaff may be removed as desired, thereby meeting the different requirements of roasters.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In a coffee mill, an enclosed casing having an inlet, cooperating cracking rolls beneath said inlet, means adjacent said inlet and cooperating with a roll for forming an air barrier, a chaff exhaust pipe connected to said casing and having a slot, said casing having a slot in registry with the slot in said pipe, said casing having an air inlet passage beneath said pipe, a shield attached to said casing between said slot and passage and having an arcuate portion adjacent said last-mentioned roll and chaff exhausting means connected to said pipe.

2. In a coffee mill, a casing, coffee cracking means housed in said casing and including a roll, finishing rolls beneath said cracking rolls, a chaff exhaust pipe connected to said casing and having lengthwise communication with said casing adjacent said cracking roll, said casing having an air inlet beneath said pipe, a shield between said air inlet and said lengthwise communication with said casing and having an arcuate portion adjacent said cracking roll, said casing having a coffee inlet to said cracking means and means forming an air barrier between said inlet and cracking roll for the purpose set forth.

3. In a coffee mill, a casing having an inlet port and a slot in one side, means beneath said inlet port for cracking coffee beans including a roll, said casing having a downwardly extending chute member forming one side of said inlet port, means between said chute member and roll for forming an air barrier between said inlet port and slot, an air inlet passage beneath said roll, a shield attached to said casing between said slot and air passage and having an arcuate portion adjacent said roll and means for exhausting chaff through said slot.

4. In a coffee mill, a casing having an upper inlet port and a lateral slot, means beneath said inlet port for cracking coffee beans including a roll, means between said casing and roll for forming an air barrier between said inlet port and slot, a chaff exhause pipe attached to the side of said casing and having a slot in registery with the slot in said casing, said casing having an air inlet port beneath said pipe, and a shield attached to said casing between said slot and air inlet passage and having an arcuate portion concentric with said roll.

5. In a coffee treating apparatus including a casing having a coffee inlet and a rotating cracking roll in communication with the inlet, means for removing chaff from the cracked coffee including a curved passageway embracing only a portion of the cracking surface of the rotating roll remote from the cracking side of the roll and which portion of said cracking surface is positioned to be contacted by the chaff being removed, said passageway having one end in communication with the cracked coffee discharged from said cracking roll, impelling means for forcing the chaff from the discharged cracked coffee through said passageway and around the embraced portion of the roll to the other and discharge end of the passageway, and barrier means for separating said coffee inlet and the outlet end of said chaff passageway.

6. In a coffee treating apparatus including a casing having a coffee inlet and a rotating cracking roll in communication with the inlet, means for removing chaff from the cracked coffee including a curved passageway embracing only a portion of the cracking surface of the rotating roll remote from the cracking side of the roll and which portion of said cracking surface is positioned to be contacted by the chaff being removed, said passageway having one end in communication with the cracked coffee discharged from said cracking roll, impelling means for forcing the chaff from the discharged cracked coffee through said passageway and around the embraced portion of the roll to the other and discharge end of the passageway, barrier means for separating said coffee inlet and the outlet end of said chaff passageway, and scraping means adjacent the extremities of said passageway for aiding in the removal of coffee particles including chaff from the roll.

7. In a coffee treating apparatus including a casing having a coffee inlet and a rotating cracking roll in communication with the inlet, means for removing chaff from the cracked coffee including a curved passageway embracing only a portion of the cracking surface of the rotating roll remote from the cracking side of the roll and which portion of said cracking surface is positioned to be contacted by the chaff being removed, said passageway having one end in communication with the cracked coffee discharged from said cracking roll, impelling means for forcing the chaff from the discharged cracked coffee through said passageway and around the embraced portion of the roll to the other and discharge end of the passageway, and barrier means for separating said coffee inlet and the outlet end of said chaff passageway, said impelling means including a plurality of controllable air passageways in communication with said discharged cracked coffee for effecting a variable impelling action on the chaff to be removed.

ALBERT J. HAZLE, Jr.